May 13, 1958     E. M. BATTEY     2,834,473

FILTER

Filed Feb. 16, 1953     5 Sheets-Sheet 1

INVENTOR.
Everett M. Battey
BY
J. Grinz
Agent

May 13, 1958 E. M. BATTEY 2,834,473
FILTER
Filed Feb. 16, 1953 5 Sheets-Sheet 2
Figure 2
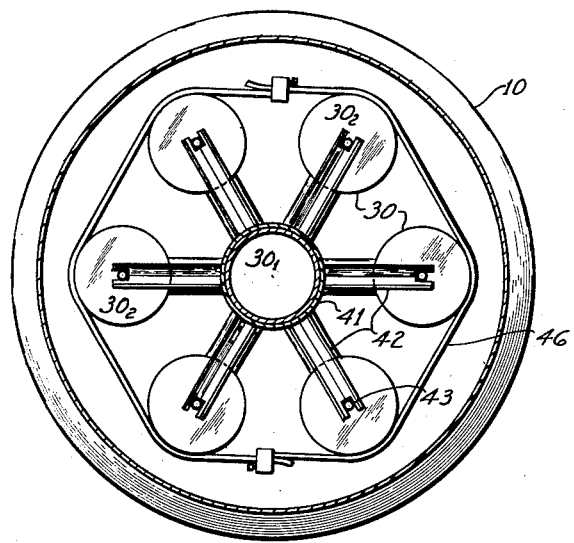
Figure 4
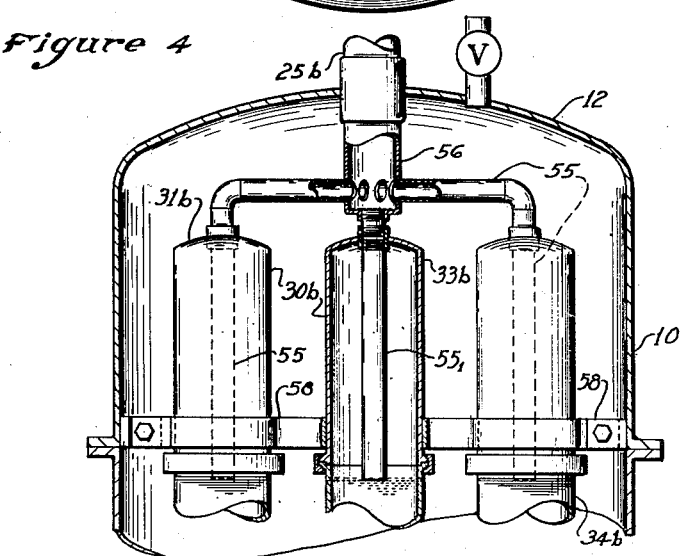
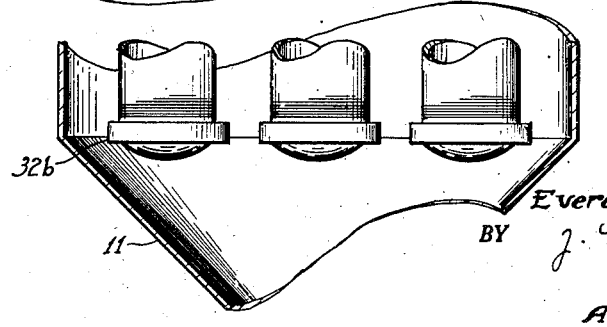
INVENTOR.
Everett M. Battey
BY
Agent

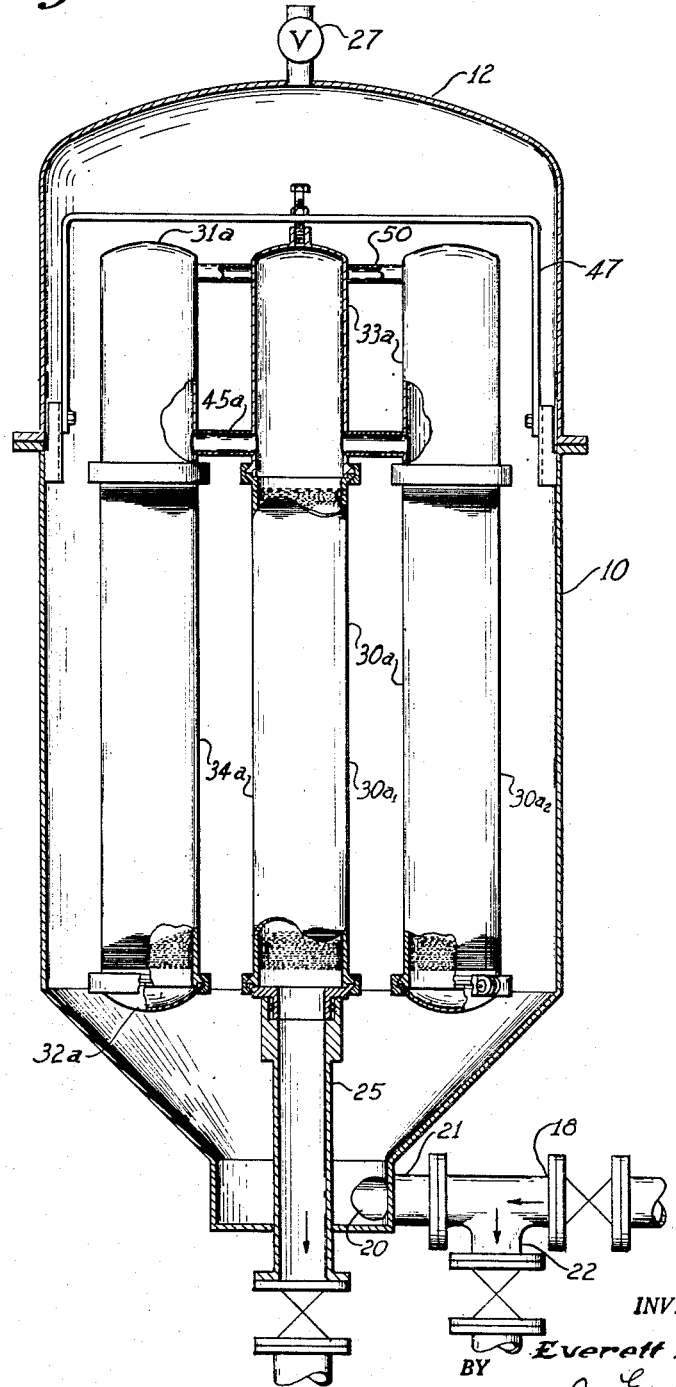

May 13, 1958  E. M. BATTEY  2,834,473
FILTER
Filed Feb. 16, 1953  5 Sheets-Sheet 4

INVENTOR.
Everett M. Battey
BY
Agent

May 13, 1958 E. M. BATTEY 2,834,473
FILTER
Filed Feb. 16, 1953 5 Sheets-Sheet 5
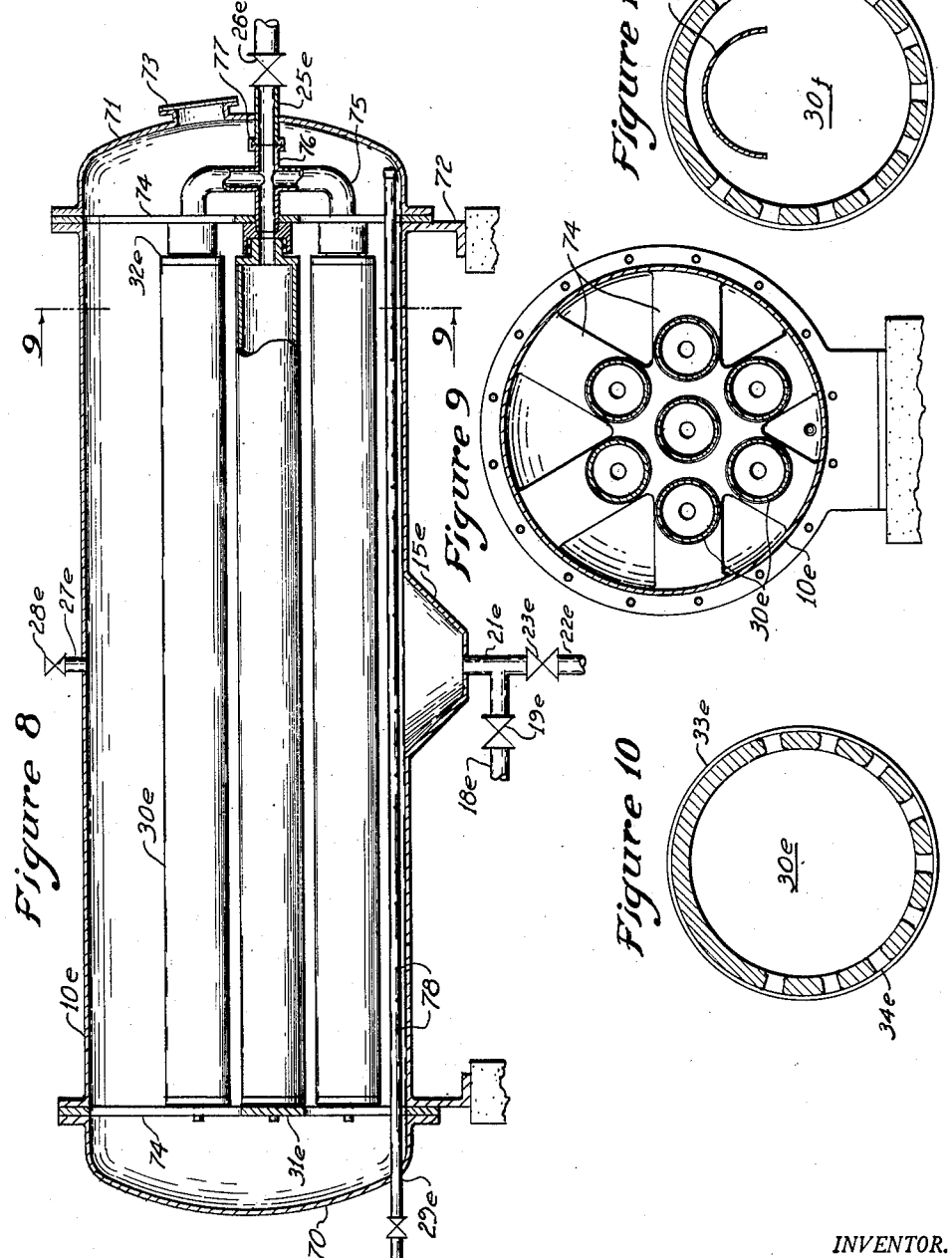
INVENTOR.
Everett M. Battey
BY
Agent United States Patent Office 2,834,473
Patented May 13, 1958

2,834,473
FILTER

Everett M. Battey, Alexandria, Va., assignor to Infilco Incorporated, Tucson, Ariz., a corporation of Delaware Application February 16, 1953, Serial No. 337,089

12 Claims. (Cl. 210—333)

The subject matter of this patent may be used by or for the Government of the United States for governmental purposes without the payment of royalties to this patentee.

This invention relates to filters of the type wherein the liquid is filtered through one or more elements comprising a permeable, rigid foundation on which a filter bed or coat of filter aid material, such as, for example, diatomaceous earth, is deposited.

Filters of this general type are referred to in the art as "diatomite filters," and this designation will sometimes be used herein. It should, however, be understood that the term "diatomite filter" is used herein in a generic sense, without limitation to any particular filter construction or filter aid material.

The invention provides a new construction for such filters which is more economical and overcomes certain difficulties heretofore experienced in operation, and particularly improves the filter washing.

It is an object of this invention to provide an improved diatomite filter.

Another object is to provide a simplified and more economical construction for a diatomite filter.

Another object is to provide means for improved backwashing of a diatomite filter.

Another object of the invention is to provide a filter element for a diatomite filter, wherein the air for washing can be trapped and retained during filtering.

Another object is to provide an element having an impervious portion, serving as an air trap, and a detachable pervious portion, serving for filtering.

Another object of the invention is a sectional element with a plurality of air traps and filtering areas alternately arranged.

Another object is to provide a simplified and more economical support for the filter elements of a diatomite filter.

Other objects will become apparent upon consideration of the detailed description and of the claims which follow.

Diatomite filters comprise a shell or casing wherein one or more filter elements are supported in such manner that the liquid to be filtered, entering the filter, can reach the filter outlet only by passing through the filter elements. Usually the elements are supported from a plate extending across the entire filter shell and dividing the filter into an inlet chamber on its one side and an outlet chamber on its other side, and provided with ports registering with the elements. The plate may be in the upper portion of the filter, with the elements extending downwardly therefrom into the inlet chamber, or it may be in the lower portion of the filter, with the elements extending upwardly therefrom.

During filtering, the impurities in the liquid under treatment are retained by the bed or coat of filter aid material on the elements. When the pressure drop across the elements has reached a predetermined value due to clogging of the coat of filter aid material by the retained impurities, the elements must be washed. This can be done in various ways, as by a reversal of flow through the elements, which may be assisted by streams of liquid along the outside of the elements. A very effective method of washing is the so-called "air-bump" wash, as described in Patent No. 2,423,172. In the washing method of said patent, a body of air for quick release is trapped under the dividing plate, and a second body of air for operating the washing is trapped under the cover of the filter casing. When the air under the dividing plate is released, the body of operating air expands and drives the liquid in the outlet chamber of the filter and in the elements at high velocity through the permeable walls of the elements into the inlet chamber, from which it is drained, carrying away the washed-off filter cake and dirt.

Washing in this manner is efficient, but in practice some drawbacks have been experienced. Thus, the plate across the filter must be quite strong to withstand the pressure differentials across it, and the seals between the plate and the elements must be airtight to prevent escape of the air trapped below the plate. In spite of careful and expensive construction, the air has sometimes been lost. Further, it has been found that the high velocity of the flow, caused by the sudden expansion of the operating air, on which the success or the "air-bump" wash depends, frequently stops before washing of the elements is completed. This is due to the fact that, in conventional "air-bump" washing, the operating air must accelerate a large mass of liquid, including not only the liquid in the elements and in the inlet chamber, but also the liquid in the filter head.

One aspect of my invention relates to an improvement in the "air-bump" washing of elements of a diatomite filter by storing the air for washing in a place where it is more readily available for uniform cleaning of the elements and must accelerate a lesser quantity of liquid.

Another aspect of the invention relates to a simplified filter construction wherein the customary dividing plate, and the necessity of air-tight seals, is eliminated.

The invention will be more readily understood from consideration of the drawings, which form a part hereof, and wherein similar elements in the several figures are designated by similar reference characters.

Figure 2 is a horizontal cross-sectional view along line 2—2 of Figure 1;

Figure 3 is a vertical cross-sectional view, partly in elevation, of a modification of the filter of Figure 1;

Figure 4 is a partial vertical cross-sectional view, partly in elevation, of another embodiment of the invention;

Figure 8 is a vertical cross-sectional view, partly in elevation, of another embodiment of the invention;

Figure 9 is a cross-sectional view along line 9—9 of Figure 8;

Figure 10 is a vertical cross-sectional view, on an enlarged scale, through one of the elements of Figure 8; and Figure 11 is a vertical cross-sectional view, on an enlarged scale, through a modified element.

Figure 1:
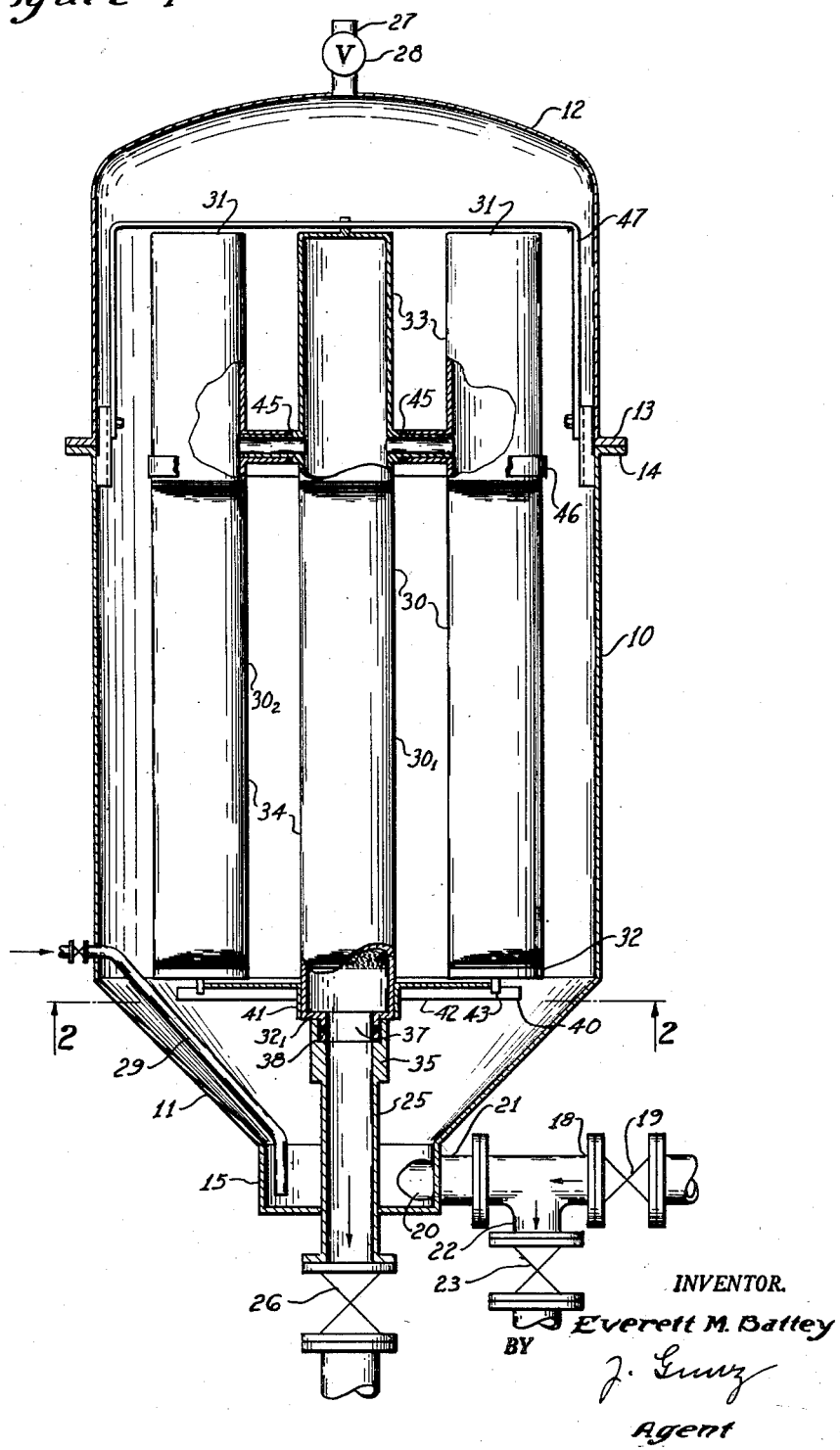
Figure 1 is a vertical cross-sectional view, partly in elevation, of a filter according to the invention.

The filter shown in Figure 1 comprises a shell or casing 10, provided with a hopper bottom 11 and a top 12. Flanges 13 and 14 of the top and shell, respectively, may be secured to one another by any suitable means, not shown. Preferably, the hopper bottom 11 has a cylindrical lower portion 15, as shown.

An inlet conduit 18, provided with a valve 19, is connected to a port 20 in the cylindrical portion 15 of the hopper bottom 11 by a conduit 21, and a drain conduit 22, provided with a valve 23, is also connected by conduit 21 to the port 20. Filtered liquid is discharged from the filter through a conduit 25, provided with a valve 26, and extending through the cylindrical portion 15. A vent 27 leads from the top 12 of the casing 10 and is provided with an air release valve 28, preferably of the quick-acting type. Air under pressure may be admitted to the hopper bottom 11 by a valved pipe 29, connected to a suitably supply of air under pressure, not shown.

A plurality of filter elements 30 is supported in shell 10, interposed between the inlet port 20 and the filtered liquid conduit 25. As shown in Figure 1, each element 30 has a solid top 31 and a solid bottom 32 and has a side wall with an impervious upper portion 33 and a pervious lower portion 34. For purposes of illustration, the pervious portion 34 is diagrammatically shown as formed by wire windings helically wound on a cage or former of foramminous material, as described in Patent No. 2,347,927, but any suitable porous material, such as ceramic, may be used for the portion 34 of the element.

One element $30_1$ of the group of elements is centrally disposed in the casing 10, and the other elements $30_2$ are symmetrically disposed about the central element. While six outer elements $30_2$ are shown for purposes of illustration, it will be obvious that a greater or smaller number can be used. The center element $30_1$ is supported on the conduit 25 as follows: A socket 35 is affixed to the conduit 25 and bears against the bottom plate $32_1$ of the center element. The bottom plate $32_1$ has a central port 37, surrounded by a cylindrical extension 38, which is slipped between the conduit 25 and the socket 35. The weight of the outer elements $30_2$ is carried by a spider 40, which is affixed to the central element. As shown in Figure 1, the central element $30_1$ is longer than the outer elements, and a collar 41 is fixed about its lower part. Spider arms 42 extend radially from the collar 41, and the outer end of each arm 42 is slotted, as shown in Figure 2, to receive a nipple 43, extending from the bottom of each of the outer elements $30_2$.

The outer elements $30_2$ are connected with the central element by connecting overflow pipes or conduits 45, which are disposed adjacent the lower ends of the impervious portions 33 of the elements. The pipes 45 are the only liquid outlets from the outer elements. The pipes 45 also serve to keep the elements properly spaced and in upright position. The element assembly thus formed is further strengthened by a band 46 of metal, or other suitable material, wound around its outer circumference. A retaining bar 47 prevents upward movement of the assembly, so that the nipples 43 are securely held in the slots of arms 42.

During the filling of the filter, all valves except the inlet valve 19 and outlet valve 26 are closed. It will be obvious that the liquid rising in the shell 10 will trap air under the top 12 of the filter and that, as the liquid filters through the pervious portions 34 of the elements and rises to the overflow pipes 45, it also traps air in the upper impervious portions 33 of the elements 30. It will be also obvious that, after the filling is completed, the liquid from all outer elements $30_2$ passes through the respective pipes 45 into the central element $30_1$ and is discharged therefrom through conduit 25.

When washing becomes necessary, outlet valve 26 is closed, and when full pump pressure is built up in the tank, the inlet valve 19 is closed. The vent valve 28 is then opened to release the air trapped under the top 12. Immediately upon the escape of the release air through the vent 27, the air compressed in the top portion 33 of each of the elements expands and drives the liquid in the elements with high velocity through the pervious portions 34 of the elements into the surrounding space in the filter shell, displacing the liquid therein into the space under the top 12. The air traps in the elements and in the filter top are so dimensioned to one another that the liquid displaced into the filter top by the expansion of the operating air substantially fills the release air trap, but never reaches the valve 28. The high velocity flow through the elements breaks off the filter cake and cleans the interstices of the element from dirt. The wash liquid carrying the broken-off filter cake and dirt is withdrawn through drain 22. The removal of the filter cake and dirt particles with the wash liquid is assisted, and their settling in the lower portion of the element prevented, by discharging compressed air into the cylinder bottom portion 15 through air pipe 29. The air violently agitates the liquid flowing to the drain and maintains the solid particles in suspension in the liquid. The air discharged into the bottom portion of the filter rises into the upper part of the shell countercurrent to the wash liquid and agitates the liquid, breaking up chunks of filter aid material. The air is trapped in the upper portion of the tank by closing valve 28, and the pressure built up speeds the rate of discharge or permits waste discharge to a drain at a level higher than the bottom of the filter.

The new filter construction has several important advantages. By trapping the operating air within the elements, each element has its own body of operating air. Leakage from one of these air traps will, therefore, affect only the washing of the respective element, while the other elements continue to be properly washed. Further, whereas in conventional design the operating air must accelerate the substantial quantity of liquid in the filter head, in addition to the liquid in the element and surrounding the element, in the new design according to the invention the operating air need not accelerate the liquid in the filter head. Accordingly, the high velocity flow, resulting from the expansion of the air, does not stop prematurely before the elements are uniformly and thoroughly washed.

The new construction also permits eliminating the dividing plate, which has customarily been used for trapping release air and for supporting the elements, the more economical spider support being substituted for the supporting function of the plate. This results in a filter which can very readily be assembled and dismantled. The elements can be completely assembled outside the filter and are installed in the filter by slipping the cylindrical extension 38 of the center element $30_1$ between the socket 35 and the filtered liquid conduit 25, and thereafter fastening the bar 47. Conversely, when it is necessary to remove the elements for inspection, repair, or replacement, the element assembly can be lifted out of the shell 10 as a unit by simply detaching the top 12 and the bar 47.

The filter shown in Figure 3 is in most respects quite similar to the filter of Figure 1. The filter casing 10, the inlet means 18—21—20, filtered liquid outlet conduit 25, vent 27, and drain 22, are the same as in Figure 1, and an air pipe, such as pipe 29 of Figure 1, may be provided also in this embodiment. The filter elements 30a are arranged in the same general manner, with one element $30a_1$ in the center and the others disposed symmetrically about the central element. The construction of the elements 30a is also similar to that shown in Figure 1, each element 30a having a solid top 31a and solid bottom cap 32a, an impervious upper portion 33a, forming a trap for the operating air, a pervious lower portion 34a forming a filtering area. Connecting pipes 45a provide an overflow for the liquid from the outer elements to the center element.

However, in this embodiment of the invention, the impervious and pervious portions, 33a and 34a, respectively, of the elements are made as separate parts, which are clamped together, as shown. Therefore, in this embodiment of the invention a worn-out or damaged filtering portion 34a can be replaced without replacing the respective impervious air trap portion 33a. Since the impervious portions are not nearly as much subject to wear as the filtering portions, this construction involves considerable savings, as compared with the elements of Figure 1, where the entire element must be replaced when its filtering portion 34 needs replacement. Further, the bottom caps 32a of the outer elements are clamped to the elements 30a by the same joints as are used for clamping the pervious portions 34a to the impervious portions 33a. Therefore, if a filtering portion 34a must be taken out of service, and no immediate replacement is at hand, the respective filtering portion 34a can be removed, and its bottom cap 32a be clamped to the end of the respective impervious portion 33a, thus inactivating a faulty element, while the other elements remain in service. In conventional diatomite filters no means are provided for taking individual elements out of service, and a faulty element must be replaced, or the entire filter be taken out of service, to avoid that insufficiently filtered or unfiltered liquid reaches the filtered liquid outlet.

Figure 7:
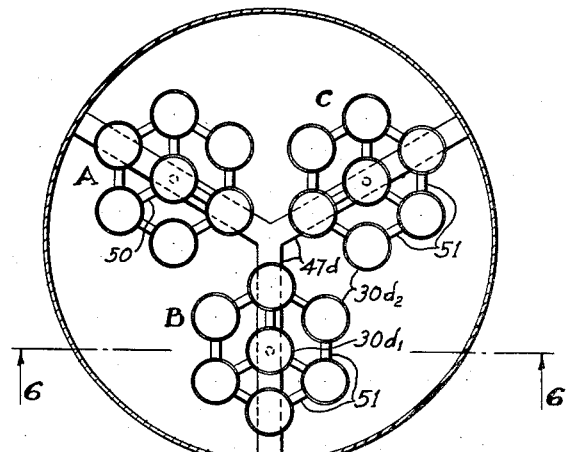
Figure 7 is a horizontal sectional view along line 7—7 of Figure 6.

Further, while in this embodiment the central element is supported by the filtered liquid conduit 25, as in the embodiment of Figure 1, the spider support 40 for the outer elements is eliminated. The outer elements $30a_2$ are supported from the center element $30a_1$ by pipes 45a and by spacers 50, which rigidly connect the outer elements to the center element. The outer elements may also be connected with one another by spacers 51, as shown in Figure 7, and in such case spacers 50 will be provided only between alternate outer elements and the center element. As in Figure 1, a retaining bar 47 is provided to prevent vertical movement of the element assembly. Elimination of the spider 40 makes it possible to use elements of identical length, and thus permits standardizing the element design.

In Figure 4 the invention is embodied in a somewhat different form, but the essential characteristics of the invention are retained also in this embodiment, i. e. the operating air is trapped in the upper part of the elements, resulting in better washing, and the expensive supporting plate across the filter and the air-tight seals around the elements are eliminated. As in the other figures, the filter shell 10 is cylindrical and has a hopper bottom 11 and a top 12 from which a valved vent leads. The inlet means for liquid to be filtered, the drain, and the air pipe are the same as in Figures 1 to 3, and are not shown.

The elements 30b are arranged in the same general manner as in the other figures, and each element has a closed top 31b and a closed bottom 32b, an impervious upper portion 33b, and a pervious lower portion 34b. The portions 33b and 34b are shown, for purposes of illustration, as separate parts, clamped together, as described in connection with Figure 3; however, obviously the two portions of the element could be integral, as in Figure 1.

Instead of the overflow pipes 45 or 45a of Figures 1 and 3, in this embodiment the filtered liquid is withdrawn from the individual elements through conduits 55 leading from the liquid-holding portion of the element, through the air space in the upper impervious portion 33b and the top 31b of the element. The conduits 55 are connected to a common header 56. Obviously, the header 56 could discharge the filtered liquid from the outer elements to the central element, as through the conduit $55_1$, and the filtered liquid from all the elements could be withdrawn in the same manner as in Figures 1 and 3. However, for purposes of illustration, the header 56 is shown in this embodiment connected to a filtered liquid conduit 25b, leading through the top 12 of the filter. With this construction, the conduit $55_1$ serves the same purpose as the other conduits 55, i. e., for withdrawing the filtered liquid from the center element.

The weight of the entire assembly is carried by the header 56, which is supported from the top 12 of the casing 10. Spacers 58 hold the elements in vertical position, properly spaced from one another and from the shell of the filter.

Figure 5:
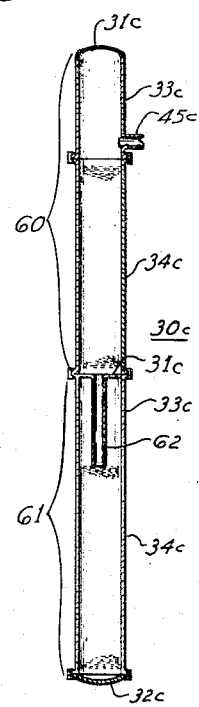
Figure 5 is a vertical cross-sectional view of a plural-section element.

The construction of Figures 1 to 4, where each element has its own operating air trap in its top portion, results in a marked improvement in the washing of the elements. The storage of operating air can be further subdivided, and further improvement in washing obtained, by using a plural-section element, such as shown in Figure 5. This type of element is particularly designed for filters of considerable depth, requiring very long elements.

Each of the sections 60 and 61 of the element 30c of Figure 5 has a closed top 31c, an impervious upper portion 33c, forming with the top 31c an air trap, and a pervious lower portion 34c, forming a filter area. The pervious and impervious portions of each section can be integral, as shown in section 61, or in separate parts, clamped together, as shown in section 60. The impervious portion 33c of the lower section 61 is clamped to the end of the pervious portion 34c of the upper section 60. The lower end of the lower section 61 is closed by an end cap 32c, clamped thereto. Preferably, the same joints are used for fastening the various portions and sections of the element together.

Filtered water from the lower section 61 is conveyed to the upper section 60 by a pipe 62 extending from the liquid-holding portion of the section 61 through its air trap and registering with a port in its top 31c. Thus, the filtered liquid from both sections, 60 and 61, is withdrawn through the upper section 60. It may be discharged therefrom through connecting pipes 45c, the center element of the element assembly, and a filtered liquid conduit, as shown in Figures 1 to 3, or directly from each element to a common header, in the manner shown in Figure 4. When the outer elements are connected to the center element in the manner shown in Figures 1 to 3, the pipe 62 of the center element will serve for flow of filtered liquid from its upper to its lower section, for discharge through the filtered liquid conduit.

While element 30c is shown as consisting of two sections, it will be obvious that a greater number can be used, if the length of the element makes this desirable, and that filtered liquid will be discharged from each additional section to the superposed section through a pipe, such as pipe 62. By providing a plurality of air traps along the element, the acceleration of the liquid by the expanding air is equally distributed over the entire length of the element, and washing is more uniform.

Figure 6:
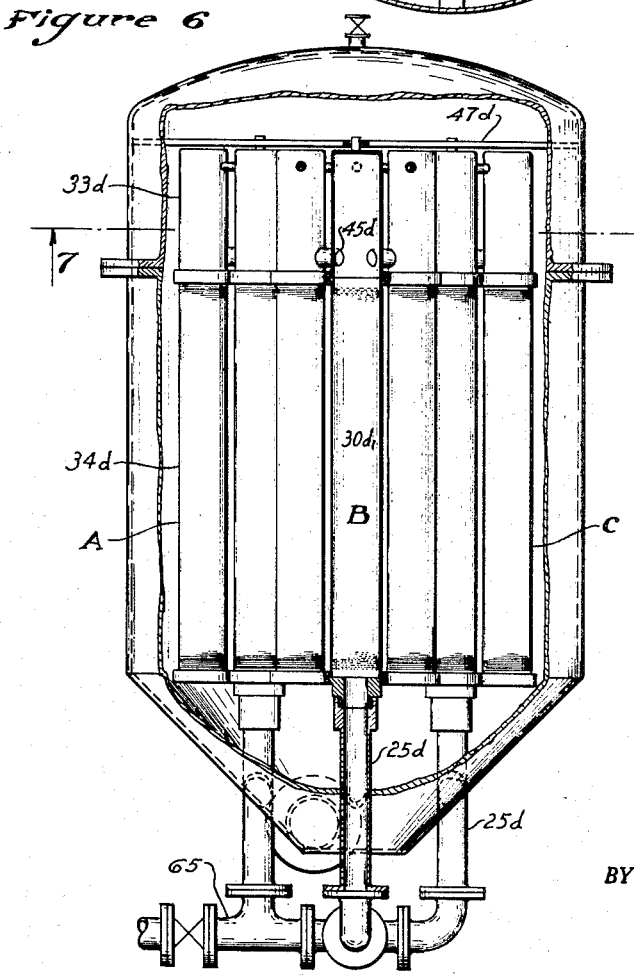
Figure 6 is a vertical cross-sectional view, partly in elevation, of a filter with several groups of elements, the section being taken along line 6—6 of Figure 7.

In large filters it may be desirable to use several groups of elements. A plural-group arrangement is shown in Figures 6 and 7. While three groups of elements are shown in these figures, it will be obvious that more or less groups could be used. Each group of elements A, B, and C is arranged in the same general manner as the elements in Figures 1 and 3, with a central element $30d_1$ and a plurality of outer elements $30d_2$ connected to the center element by overflow pipes 45d. For purposes of illustration, the elements of Figures 6 and 7 are of the type shown in Figure 3, with separate upper air trap portions 33d and lower filtering portions 34d, which are clamped together and are held in upright position, spaced from one another and from the center element by spacers 51 between the outer elements and spacers 50 between alternate outer elements and the central element. However, the elements and supports shown in Figures 1 or 4 could also be used for a plural group arrangement, and with a deep filter segmental elements, such as shown in Figure 5, might be used with advantage.

As in the single group filters, the three groups A, B, and C are held in place vertically by retaining bars 47d, whose inner ends are integral and whose outer ends are fastened to the tank wall.

Each group of elements has a separate filtered liquid conduit 25d, which supports the center element 30d₁ and receives liquid from all elements of the respective group. The outlet conduits of all groups discharge to a common header 65 from where the filtered liquid is withdrawn to storage or to a point of use.

In the embodiments of the invention shown in Figures 8 to 11 the filter is in a horizontal position. As in the other forms of the invention, also in this embodiment the need for a solid supporting plate and airtight seals is eliminated, and air for washing purposes is stored in the elements.

The filter shown in Figures 8 and 9 has a substantially cylindrical horizontally extending casing or shell 10e, closed at its ends by dished heads 70 and 71, which are fastened to the casing 10e by any suitable means, not shown. The filter may be supported in any suitable manner, such as by legs 72. An inlet conduit 18e, provided with a valve 19e, is connected to a conduit 21e discharging into a depression 15e formed in the lower part of the shell 10e, and a drain 22e provided with a valve 23e is also connected to the conduit 21e. A filtered liquid outlet conduit 25e provided with a valve 26e leads from one of the dished heads, such as 71. A handhole 73 is provided in the head 71.

The liquid entering through the inlet conduit 18e must pass through the elements 30e before it can reach the outlet conduit 25e. The group of elements 30e preferably is arranged eccentrically in the filter shell to leave a free space in the upper part of the shell, wherein the release air for the air-bump wash can be trapped and stored. A vent 27e, provided with a valve 28e, leads from this air trap. The elements are supported by any suitable means, as by spiders 74.

Each element has solid end walls 31e and 32e and a side wall having an upper impervious portion 33e under which air can be trapped by the liquid filtering into the element through the pervious lower portion 34e of the side wall. The filtered liquid is withdrawn from the elements 30e through conduits 75, discharging to a common header 76, which is detachably connected to the filtered liquid outlet conduit 25e by any suitable means, such as a clamp 77. A valved air pipe 29e extends along the lower portion of the shell 10e and has a plurality of orifices 78. Air under pressure from a suitable source of compressed air, not shown, is discharged through the orifices 78 during backwashing to prevent settling of washed off filter aid and dirt on the bottom part of the casing 10e. The air will rise to the top of the casing 10e, agitating the liquid and breaking up chunks of filter aid material. As described in connection with Figure 1, by closing the vent valve 28e, the air can be trapped and the pressure thus built up speeds the rate of discharge, or permits discharge to a drain at a higher elevation than the bottom of the filter. By opening the handhole 73, removing clamp 77, and detaching head 71 from casing 10e, the elements can be lifted out of the filter as a unit for repair or replacement.

The modified element 30f shown in Figure 11 can be used in a horizontal filter, such as the filter of Figure 8, instead of the element shown in detail in Figure 10. In this embodiment the air trap in the element is formed by a hood-like open-bottom solid wall structure 79 in the upper part of the element. The hood 79 extends the full length of the element, and its outer ends may be affixed to the end walls of the element. A small portion of the upper part of the side wall of the element is made impervious to prevent dirt or filter aid material washed from a superposed element from penetrating into a subjacent element and depositing on the hood 79 therein. However, the impervious portion can be considerably smaller than in the element of Figure 10, and a larger part of the filter element is therefore available as filtering area.

It will be seen that the invention lends itself readily to filters of widely varying dimensions and eliminates certain drawbacks previously experienced with filters equipped for air-bump washing. It will be obvious to those skilled in the art that many modifications of the embodiments shown in the drawings, and described for purposes of exemplification and illustration, can be made without departing from the spirit and scope of the invention. For example, the filtered liquid conduit of Figures 1 and 3 need not extend through the bottom of the shell, but can extend through its top, as shown in Figure 4, with a pipe such as 55₁ conveying the filtered liquid from all elements thereto. Further, if a great number of outer elements is used in a filter of the type of Figure 1 or Figure 3, the central member can be a conduit which conveys the filtered liquid from all outer elements to the filtered liquid conduit, but is not itself used for filtering. Accordingly, it should be understood that the invention is not limited to the exact details of the embodiments shown in the drawings.

I claim:

1. A filter element for a diatomite filter of the type described comprising a hollow member free of internal structure having end walls and an encompassing side wall, said end walls being impervious members, said side wall having a lower pervious portion providing a filtering area through which the liquid filters into said element, and having an upper impervious portion cooperating with at least one of said end walls to form an airtight chamber, wherein air is compressed by the liquid filtering into said element, one of said walls having a port, and a conduit connected to said port and in direct hydraulic communication with the space in said element subjacent said airtight chamber, for withdrawing filtered liquid from said element.

2. A filter element according to claim 1, wherein said pervious and impervious portions are separate parts, clamped to one another.

3. A diatomite filter comprising a closed, unpartitioned casing provided with inlet means for liquid to be filtered, outlet means for filtered liquid, valve means for said inlet means and valve means for said outlet means, drain means, valve means for said drain means, means for venting the top portion of said casing, valve means for said last mentioned means, and at least one group of filter elements interposed between said inlet means and said outlet means each of said elements comprising a hollow member having end walls and an encompassing side wall, said side wall comprising an upper impervious portion and a lower pervious portion, said end walls comprising impervious members, said pervious portion providing a filtering area and said impervious portion of said side wall forming with the upper end wall an airtight chamber wherein air is compressed by the liquid filtering through said pervious portion, characterized by a central element and a plurality of outer elements disposed about said central element, conduit means for conveying filtered liquid from a level in said outer elements below said airtight chambers to said central element, and a filtered liquid conduit connecting the space within said central element below its airtight chamber to said outlet means.

4. In a diatomite filter of the type comprising a closed, unpartitioned casing having inlet means into its lower portion and outlet means from its upper portion, valve means for said inlet means and valve means for said outlet means, a drain connected to the bottom portion of said filter, valve means for said drain, a vent leading from a top portion of said filter, valve means for said vent, and at least one group of filter elements interposed in the line of flow from said inlet means to said outlet means, each element of the group having upper and lower end walls and a side wall encompassing the interior of the element, said end walls comprising impervious members, said side wall having an upper impervious portion, and a lower pervious portion providing a filtering area, said upper impervious end wall forming with the upper part of said impervious side wall portion in the top of said element an airtight chamber wherein air is compressed by the liquid filtering through said pervious portion, the combination with said elements of a conduit extending from the part of each element below its airtight chamber through the airtight chamber and the top of said element for conveying the filtered liquid from said element to said outlet means.

5. A diatomite filter comprising a closed unpartitioned casing, an inlet conduit for discharging liquid to be filtered to said casing, valve means for said inlet conduit, a filtered liquid conduit for conveying filtered liquid from said casing, valve means for said filtered liquid conduit, and a plurality of filter elements interposed in the line of flow from said inlet conduit to said filtered liquid conduit, a vent leading from the top portion of said casing, valve means for said vent, means for draining said casing, and valve means for said last mentioned means, each element having upper and lower end walls and a side wall encompassing the interior of the element, said side wall having an impervious upper portion and a pervious lower portion, said end walls comprising impervious members, said upper impervious end wall forming with the upper part of said impervious side wall portion in the top of said element an airtight chamber wherein air is compressed by the liquid filtering through said pervious portion, characterized in that one of said elements is centrally disposed with respect to the other elements, and supported by said filtered liquid conduit and registering therewith through a port in one of its end walls, and the other elements are arranged about, and supported from, said center element, and connected therewith by conduit means for conveying filtered liquid from points within said outer elements below their airtight chambers through the space within said center element below its airtight chamber to said filtered liquid conduit.

6. A diatomite filter comprising a closed, unpartitioned casing, inlet means for liquid to be filtered connected to the lower portion of said casing, a drain connected to the lower portion of said casing, a vent leading from a top portion of said casing, a filtered liquid conduit extending centrally through the bottom of said casing, and valves on said inlet means, said drain, said vent, and said filtered liquid conduit, a plurality of filter elements in said casing interposed in the line of flow from said inlet means to said filtered liquid conduit, each element having upper and lower end walls and a side wall encompassing the interior of said element, said side wall having an impervious upper portion and a pervious lower portion, said end walls comprising impervious members, characterized by one of said elements being centrally disposed and supported by said filtered liquid conduit and registering therewith through a port in its lower end wall, the other elements being arranged about, and supported by, said center element, connecting conduits leading from a lower part of the impervious portions of said outer elements to the impervious portion of the central element for flow of filtered liquid from said outer elements through said central element to said filtered liquid conduit, and means for discharging gas under pressure into the lower portion of said casing.

7. In a diatomite filter including a closed, unpartitioned casing, inlet means for discharging liquid to be filtered into said casing, valve means for said inlet means, means for draining said casing, valve means for said last mentioned means, a vent leading from an upper portion of said casing, valve means for said vent, outlet means for withdrawing filtered liquid from said casing, valve means for said outlet means, and a plurality of groups of filter elements interposed between said inlet means and said means for withdrawing filtered liquid from said casing, each element of each group having end walls and a side wall encompassing the interior of the element, said side wall having an upper impervious portion and a pervious lower portion, said end walls comprising impervious members, said impervious side wall portion cooperating with at least one of said end walls to form an airtight chamber wherein air is compressed by the liquid filtering through said pervious portion, the improvement comprising an element in each group centrally disposed with respect to the other elements of said group, and connecting conduits between the outer elements of each group and the central element of the group for conveying filtered liquid from the space within the outer elements below their airtight chambers into the central element, said outlet means for withdrawing filtered liquid from said casing comprising a filtered liquid conduit for each group, each filtered liquid conduit being connected to the space within the center element of its group below its airtight chamber, and a common header connected to and receiving liquid from all filtered liquid conduits.

8. In a diatomite filter having a closed, unpartitioned casing provided with inlet means for liquid to be filtered, valve means for said inlet means, outlet means for filtered liquid, valve means for said outlet means, drain means, valve means for said drain means, means for venting its top portion, and valve means for said last mentioned means, at least one group of filter elements interposed between said inlet means and said outlet means, each of said elements comprising a top section and at least one lower section, an end wall comprising an impervious member at the lower end of said element, each of said sections having an impervious upper end wall, and a side wall encompassing the interior of the section, said side wall having an impervious upper portion, forming with its upper end wall an airtight chamber in the upper portion of the respective section, and a lower pervious portion, forming a filter area through which liquid filters into the respective section, and conduit means in direct hydraulic communication with the liquid-holding portion of each section below its airtight chamber for conveying filtered liquid from the respective section, the conduit means for conveying liquid from one of said sections discharging to the other of said sections, and the conduit means for conveying liquid from the other section being operatively connected to said outlet means for filtered liquid.

9. A filter element for a diatomite filter of the type described comprising a top section and at least one lower section, an impervious end wall at the lower end of said element, each section having an impervious upper end wall and a side wall encompassing the interior of the section, said side wall having a lower pervious portion forming a filtering area through which liquid filters into the respective section, and an impervious upper portion forming with the upper end wall of the respective section an airtight chamber in the upper end of the section, wherein air is compressed by the liquid filtering through said pervious portion, and conduit means leading from each section and in direct hydraulic communication with the portion of the respective section below its airtight chamber for conveying filtered liquid from the respective section, the conduit means for conveying liquid from a lower section leading through its airtight chamber and upper end wall to the lower portion of the superposed section, whereby liquid from all sections is withdrawn from the element through the conduit means leading from the top section.

10. In a diatomite filter comprising a substantially cylindrical, unpartitioned casing having its longitudinal axis arranged horizontally, inlet means for liquid to be filtered into said casing, valve means for said inlet means, outlet means for filtered liquid from said casing, valve means for said outlet means, a vent leading from the top portion of said casing, valve means for said vent, means for draining said casing, and valve means for said last mentioned means, a horizontally extending filter element interposed in the line of liquid flow from said inlet means to said outlet means, said filter element having end walls and a side wall encompassing the interior of the element, said side wall having an impervious upper portion and a pervious lower portion through which liquid filters into the space within said element, said end walls comprising impervious members, said upper impervious side wall portion forming with the upper portions of said impervious end walls in the top of said element an airtight chamber wherein air is compressed by the liquid filtering through said pervious portion, and conduit means for conveying liquid from the space within said element below said airtight chamber to said outlet means.

11. A filter according to claim 10, wherein said airtight chamber is formed by an impervious wall structure subjacent and spaced from the upper portion of said side wall and extending parallel thereto for substantially its full length, in cooperation with the upper portions of said end walls.

12. A diatomite filter comprising a substantially cylindrical, unpartitioned closed casing having a horizontally extending longitudinal axis, inlet means into said casing for liquid to be filtered, outlet means from said casing for filtered liquid, means for draining said casing, and means for venting the top portion of said casing, a valve connected with each of said means, and a plurality of filter elements mounted in said casing with their longitudinal axes parallel with the longitudinal axis of said casing and interposed between said inlet means and said outlet means, characterized in that each of said elements comprises a pair of end walls and a side wall between said end walls, said side wall encompassing the interior of the element, said side wall having an impermeable upper portion and a permeable lower portion forming a filter area through which liquid filters into the space within said element, said end walls comprising impermeable members, said upper impermeable side wall portion forming with the upper portions of said impermeable end walls in the top of each of said elements an airtight chamber wherein air is compressed by the liquid filtering through said pervious portion, and conduit means connecting the spaces within said elements below said airtight chambers with said outlet means.

References Cited in the file of this patent

UNITED STATES PATENTS

| | | |
|---|---|---|
| 444,733 | Stockheim | Jan. 13, 1891 |
| 1,508,177 | Frazier | Sept. 9, 1924 |
| 1,993,175 | Libbey et al. | Mar. 5, 1935 |
| 2,108,798 | Dalrymple | Feb. 22, 1938 |
| 2,383,672 | Neisingh | Aug. 28, 1945 |
| 2,390,841 | Longden | Dec. 11, 1945 |
| 2,406,308 | Vokes et al. | Aug. 20, 1946 |
| 2,423,172 | Booth | July 1, 1947 |
| 2,468,603 | Pew | Apr. 26, 1949 |
| 2,519,663 | Klein | Aug. 22, 1950 |
| 2,570,132 | Koupal | Oct. 2, 1951 |
| 2,600,458 | Ackley et al. | June 17, 1952 |

FOREIGN PATENTS

| | | |
|---|---|---|
| 10,984 | Great Britain | 1845 |